United States Patent
Hanrahan et al.

(10) Patent No.: US 12,540,579 B2
(45) Date of Patent: Feb. 3, 2026

(54) REMOTE MOUNTED ACCESSORY GEARBOX

(71) Applicant: RTX Corporation, Farmington, CT (US)

(72) Inventors: Paul R. Hanrahan, Sedona, AZ (US); Stefan M. Poth, Jr., South Windsor, CT (US); Bradley C. Schafer, Ellington, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/654,628

(22) Filed: May 3, 2024

(65) Prior Publication Data

US 2025/0341186 A1 Nov. 6, 2025

(51) Int. Cl.
| | | |
|---|---|---|
| *F02C 7/32* | (2006.01) | |
| *B64D 27/14* | (2006.01) | |
| *B64D 27/20* | (2006.01) | |
| *B64D 33/02* | (2006.01) | |

(52) U.S. Cl.
CPC ............ *F02C 7/32* (2013.01); *B64D 27/14* (2013.01); *B64D 27/20* (2013.01); *B64D 2033/0273* (2013.01); *B64D 2033/0286* (2013.01); *B64D 2033/0293* (2013.01); *F05D 2220/323* (2013.01); *F05D 2260/4031* (2013.01)

(58) Field of Classification Search
CPC ........ B64D 27/02; B64D 27/14; B64D 27/20; B64D 31/14; B64D 2033/0273; B64D 2033/0286; B64D 2033/0293; F02C 7/32
See application file for complete search history.

(56) References Cited

U.S. PATENT DOCUMENTS

| | | | |
|---|---|---|---|
| 10,800,539 B2 | 10/2020 | Niergarth et al. | |
| 11,142,330 B2 | 10/2021 | Papas et al. | |
| 2009/0139243 A1* | 6/2009 | Winter | F02K 3/06 60/797 |
| 2010/0274416 A1* | 10/2010 | Poisson | G05B 19/42 701/100 |
| 2012/0308362 A1* | 12/2012 | Eleftheriou | F02C 7/32 415/122.1 |
| 2014/0060079 A1* | 3/2014 | Foster | F01D 25/28 29/893.1 |
| 2014/0179448 A1* | 6/2014 | Collins | E21B 43/128 464/106 |
| 2017/0066540 A1 | 3/2017 | Lemarchand | |
| 2017/0175639 A1* | 6/2017 | Shafique | F02C 9/36 |
| 2018/0283281 A1* | 10/2018 | Veilleux, Jr. | F02C 7/36 |
| 2020/0408151 A1* | 12/2020 | Labbe | F16D 3/06 |
| 2021/0404387 A1 | 12/2021 | Venter et al. | |
| 2022/0009645 A1* | 1/2022 | Freund | B64D 27/402 |

OTHER PUBLICATIONS

Partial European Search Report dated Oct. 2, 2025, in connection with European Patent Application No. 25174098.1, 13 pages.
European Search Report dated Dec. 23, 2025, in connection with European Application No. 25174098.1, 11 pages.

* cited by examiner

*Primary Examiner* — Scott J Walthour

(57) ABSTRACT

An apparatus includes an engine and an accessory gearbox. The engine is positioned on a top side of an aircraft. The accessory gearbox is mounted with an airframe of the aircraft remote from the engine, wherein the accessory gearbox is drivingly connected to the engine.

20 Claims, 2 Drawing Sheets

REMOTE MOUNTED ACCESSORY GEARBOX

TECHNICAL FIELD

This disclosure relates generally to aircraft gas turbine engines and processes. More specifically, this disclosure relates to a remote mounted accessory gearbox.

BACKGROUND

Gas turbine engines for aircraft typically include an accessory gearbox containing a gear train drivingly connected through a tower shaft to an engine main shaft. Conventional accessory drives require reducing the input speed, which is the rotational speed of the tower shaft, for various accessories driven by an accessory drive, such as the starter/generator, a fuel pump, a hydraulic pump, an oil pump, and/or the like.

SUMMARY

This disclosure provides a remote mounted accessory gearbox.

In a first embodiment, an apparatus includes an engine and an accessory gearbox. The engine is positioned on a top side of an aircraft. The accessory gearbox is mounted within an airframe of the aircraft remote from the engine, wherein the accessory gearbox is drivingly connected to the engine.

In certain embodiments, the apparatus further includes a tower shaft extending from the engine through the airframe to the accessory gearbox and configured to drivingly connect the engine to the accessory gearbox.

In certain embodiments, the tower shaft comprises a flex joint adjacent the engine, the flex joint configured to accommodate movement of the engine in relation to the accessory gearbox.

In certain embodiments, the tower shaft includes a flex joint adjacent the accessory gearbox, the flex joint configured to accommodate movement of the accessory gearbox in relation to the engine.

In certain embodiments, the apparatus further includes a reduction gearbox arranged between a main shaft of the engine and the tower shaft, the reduction gearbox configured to rotate the tower shaft at a different rotation speed than the main shaft.

In certain embodiments, the accessory gearbox includes a first shaft configured to drive a first accessory and a first set of gears arranged between the tower shaft and the first shaft, the first set of gears configured to rotate the first shaft at a different rotational speed from the tower shaft.

In certain embodiments, the accessory gearbox includes a second shaft configured to drive a second accessory and a second set of gears arranged between the tower shaft and the second shaft, the second set of gears configured to rotate the second shaft at a different rotational speed from the tower shaft.

In certain embodiments, a rotational speed of the second shaft is different from a rotational speed of the first shaft.

In certain embodiments, the apparatus further comprises an accessory driven by the accessory gearbox, wherein the accessory is one of a fuel pump, a hydraulic pump, an oil pump, an electric generator, a permanent magnet alternator, and a manual engine starter.

In certain embodiments, the apparatus further comprises an engine controller, at least one sensor, and a remote interface unit. The engine controller is mounted to the accessory gearbox and configured to remotely control the engine. The at least one sensor is mounted on the engine. The remote interface unit is operably coupled to the at least one sensor and configured to transmit outputs of the at least one sensor to the engine controller and control the engine based on signals received from the engine controller.

In a second embodiment, an apparatus includes an engine, and an accessory gearbox. The accessory gearbox is mounted remotely from the engine at an elevation equal to or below a fuel tank, wherein the accessory gearbox is drivingly connected to the engine.

In certain embodiments, the apparatus further includes a tower shaft extending from the engine through the airframe to the accessory gearbox and configured to drivingly connect the engine to the accessory gearbox.

In certain embodiments, the tower shaft comprises a flex joint adjacent the engine, the flex joint configured to accommodate movement of the engine in relation to the accessory gearbox.

In certain embodiments, the tower shaft includes a flex joint adjacent the accessory gearbox, the flex joint configured to accommodate movement of the accessory gearbox in relation to the engine.

In certain embodiments, the apparatus further includes a reduction gearbox arranged between a main shaft of the engine and the tower shaft, the reduction gearbox configured to rotate the tower shaft at a different rotation speed than the main shaft.

In certain embodiments, the accessory gearbox includes a first shaft configured to drive a first accessory and a first set of gears arranged between the tower shaft and the first shaft, the first set of gears configured to rotate the first shaft at a different rotational speed from the tower shaft.

In certain embodiments, the accessory gearbox includes a second shaft configured to drive a second accessory and a second set of gears arranged between the tower shaft and the second shaft, the second set of gears configured to rotate the second shaft at a different rotational speed from the tower shaft.

In certain embodiments, a rotational speed of the second shaft is different from a rotational speed of the first shaft.

In certain embodiments, the apparatus further comprises a fuel pump driven by the accessory gearbox, wherein the fuel pump provides fuel from the fuel tank to the engine.

In certain embodiments, the apparatus further comprises an engine controller, at least one sensor, and a remote interface unit. The engine controller is mounted to the accessory gearbox and configured to remotely control the engine. The at least one sensor is mounted on the engine. The remote interface unit is operably coupled to the at least one sensor and configured to transmit outputs of at least one sensor to the engine controller and control the engine based on signals received from the engine controller.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
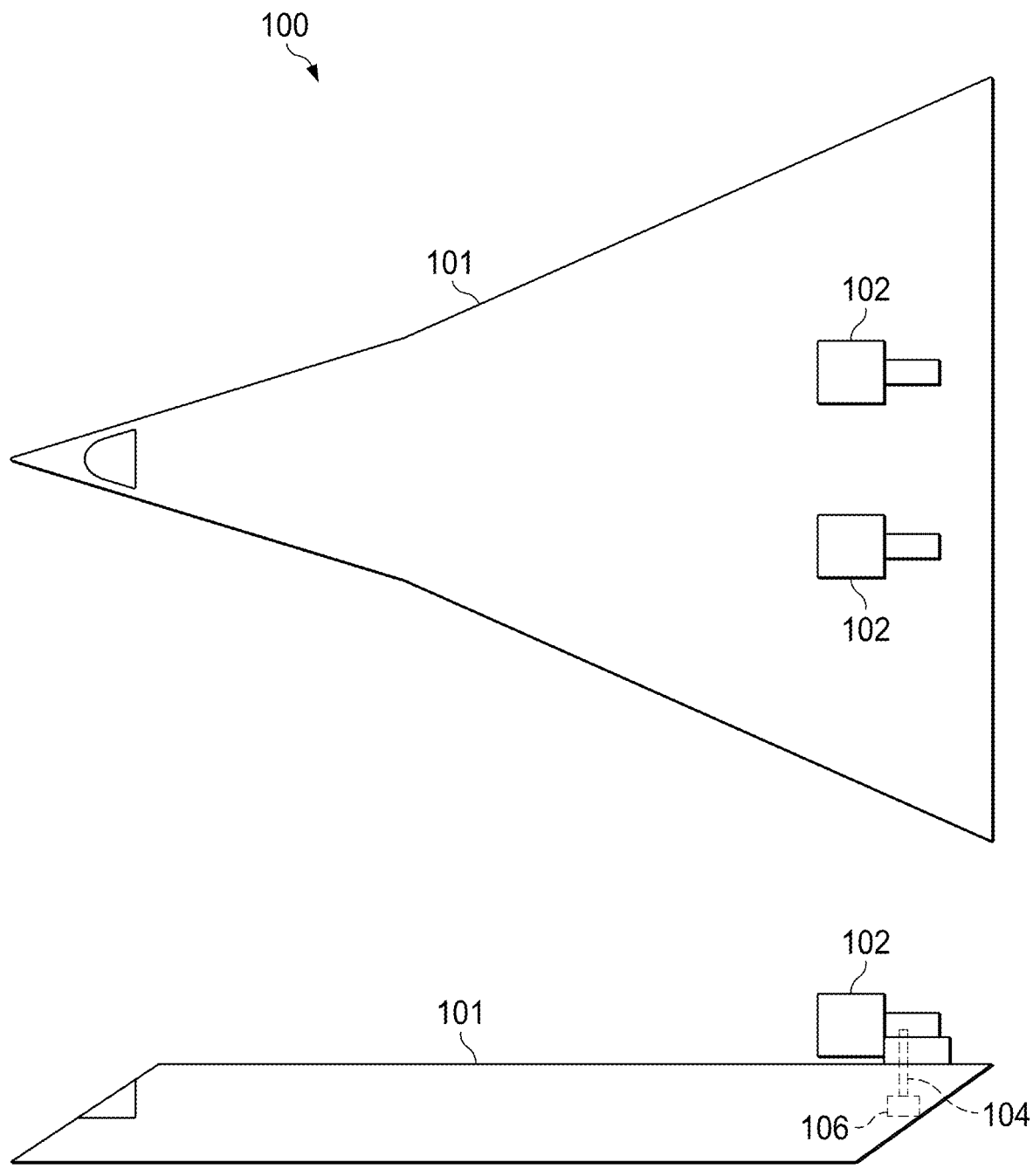
FIG. 1 illustrates an example remote mounted gearbox on an aircraft in accordance with this disclosure.
Figure 2:
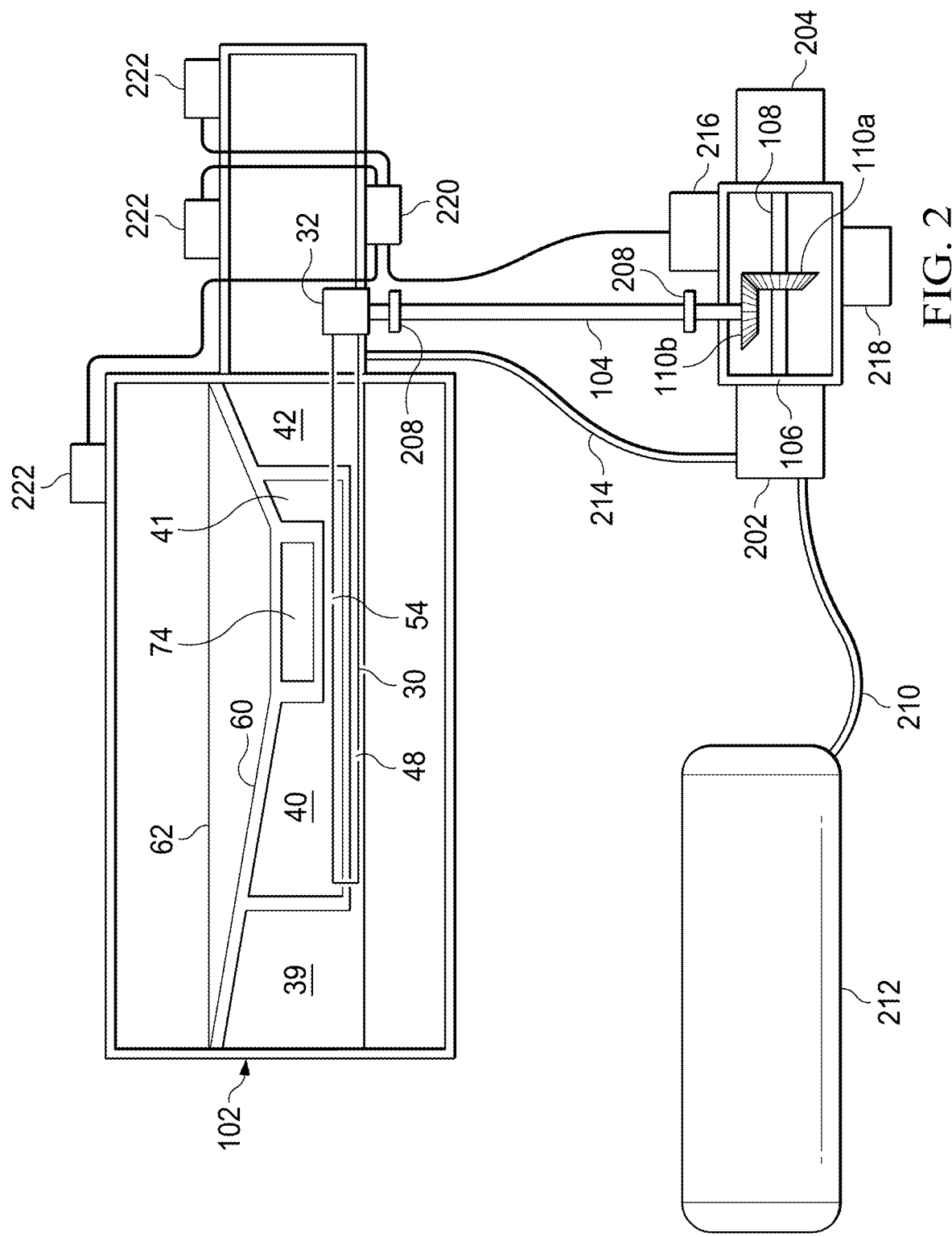
FIG. 2 illustrates a schematic view of the accessory gearbox of FIG. 1.

FIGS. 1 through 2, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

Maintenance access on high mounted engines is difficult, which raises maintenance costs. An extended tower shaft allows for the accessory gear box to be mounted at a lower elevation or height than the engine. This may allow for easier access to components driven by the accessory gearbox, such as for maintenance, replacement, and/or the like.

FIG. 1 illustrates an aircraft with an accessory gearbox mounted remote from an engine of an aircraft in accordance with this disclosure. As shown in FIG. 1, aircraft 100 can include an airframe 101 (e.g., fuselage, wings, empennage, etc.), an engine 102, such as a gas turbine engine, a tower shaft 104, and an accessory gear box 106. The aircraft 100 can include one or more gas turbine engines 102. In the illustrative example of FIG. 1, the engines 102 are installed on a top side of the airframe 101. In some examples, the aircraft 100 can include one or more accessory gear boxes 106. As depicted in FIG. 1, the accessory gear box 106 can be installed at a height lower than the engine(s) remote from the engines 102. The accessory gear box 106 can be operably coupled to the engine 102 through the tower shaft 104. The tower shaft 104 can transfer the rotational movement of a shaft of engine 102 to rotate the accessory gear box 106.

As shown in FIG. 2, the engine 102 can include a housing or nacelle 62, a core casing 60, a low-pressure spool assembly 48, which can include a fan assembly, a low-pressure compressor assembly 39, and a low pressure turbine assembly 42, and a high pressure spool assembly 54 which can include a high pressure compressor assembly 40 and a high pressure turbine assembly 41. A core casing 60 can surround the low-pressure and high-pressure spool assemblies 48 and 54 in order to define a main fluid path therethrough including a combustor 74. The tower shaft 104 can be disposed at a non-zero angle to the co-axial main shafts 30 of the respective low-pressure and high-pressure spool assemblies 48 and 54, is operatively connected at one end thereof to one of the main shafts 30, for example of the high-pressure spool assembly 54, and is operatively connected at the other end thereof to the accessory gearbox 106. A reduction gearbox 32 can be included between the main shafts 30 and the tower shaft 104 to rotate the main shaft 30 and the tower shaft 104 at different rotational speeds. For example, the reduction gearbox 32 can be arranged to rotate the tower shaft at a slower rotation speed than the main shafts 30. The tower shaft 104 and the accessory gearbox 106 form a mechanical drive system for transferring engine power to drive a fuel pump 202 and one or more other accessory devices 204, such as a hydraulic pump, oil pump, electric generator, permanent magnet alternator, manual engine starter such as a hand crank, etc.

The accessory gearbox 106 can include one or more shafts 108 having respective rotational axes in combination with a rotational axis of the tower shaft 104 to define a common plane. For example, the shaft(s) 108 can be disposed co-axially in the accessory gearbox 106, may be in an end-to-end relationship according to this embodiment, and can be supported within the housing of the accessory gearbox 106 by a plurality of bearings. A first shaft 108 can be operatively connected to at least one accessory device 204 to drive the at least one accessory device 204 at a relatively low rotational speed. The at least one accessory device 204 may include, but is not limited to, a hydraulic pump, an oil pump, a generator, a permanent magnet alternator, and/or the like. The first shaft 108 can be conventionally connected to the tower shaft 104 with one or more pairs of gears 110 (illustrated as 110a, 110b) tailored to the design of the at least one accessory device 204 and conducive to its function.

In the simplified illustration of FIG. 2, a pair of gears 110 are shown, as an example to illustrate an operative connection to drive (but not to be limited to) a fuel pump 202. The pair of gears 110 can include a gear 110a mounted on the first shaft 108, for example, adjacent to one end thereof which is in the end-to-end relationship with a second shaft 108. The gear 110a meshes with a gear 110b that is operatively connected with a shaft 108 configured to drive, for example, a hydraulic pump or other accessory device 204.

A second pair of gears (not illustrated) may include a first gear which is mounted on the first shaft 108 at an axial location relatively distal from the end of the second shaft 108 which is in the end-to-end relationship to a third shaft 108. The second pair of gears transfers the rotational force of the first shaft 108 to the third shaft 108 and is for driving a different accessory, for example, the fuel pump 202. The second pair of gears can provide different gear ratios to rotate the second shaft 108 at a different rotational speed than the third shaft 108.

A dual input drive to the accessory drive gearbox 106 can be achieved by at least two gears mounted on the tower shaft 104 and meshing with respective gears 110 mounted on the shaft 108 and/or another shaft.

The tower shaft 104 can further include one or more flex joints 208. The flex joint(s) 208 allow for movement of the accessory gearbox 106 in relation to the engine 102. The term "flex joint" refers to a category of joints that transmits torque between features that may be misaligned, such as a universal joint or constant velocity joint. For example, while the aircraft 100 is in flight, any torsion, expansion, contraction, or relative movement of the airframe 101 and/or engine 102 could be accommodated by the flex joints 208. A first flex joint 208 can be positioned adjacent the engine 102 and a second flex joint 208 can be positioned adjacent the accessory gearbox 106. Additional flex joints 208 can be positioned within an interior of the aircraft 100 to accommodate any change in rotation or translation between portions of the airframe 101.

The fuel pump 202 can be attached to a housing of the accessory gearbox 106. The fuel pump 202 can be connected to a first fuel line 210 to draw fuel from an aircraft fuel tank 212. The fuel pump 202 can also be connect to a second fuel line 214 to provide the fuel from the aircraft fuel tank 212 to the gas turbine engine 102. In some examples, the fuel pump 202 may be located at an elevation/height equal to or below the fuel tank such that gravity abets flow through fuel line 210 from fuel tank 212 to fuel pump 202. In some examples, the fuel pump 202 may be located at an elevation/height above the fuel tank. In such examples, the fuel tank 212 may include an additional pump to pre-pressurize fuel in the fuel line 210 from the fuel tank 212 to the fuel pump 202.

Additional components, such as engine controller 216 and other non-driven accessories 218 (e.g., accessories not driven by a shaft 108) can be mounted to the accessory gear box 106 instead of the engine 102, to make them more accessible. The engine controller 216 can be wired or wirelessly connected to a remote interface unit 220 that is connected to sensors 222 on the engine 102 and to controls of the engine 102. The readings from the sensors 222 can be transmitted to the engine controller 216 through the remote interface unit 220. The engine controller 216 can control operations of the engine 102 through the remote interface unit 220. Non-driven accessories 218 can include an AC/DC inverter, a motor control unit, a fuel oil cooler, an oil tank, and a fuel pump control unit.

Although FIGS. 1 and 2 illustrate an example remote mounted gearbox on an aircraft, various changes may be made to FIGS. 1 and 2. For example, various components in FIGS. 1 and 2 may be combined, further subdivided, replicated, omitted, or rearranged and additional components may be added according to particular needs.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
an engine positioned on a top side of an aircraft;
an accessory gearbox mounted within an airframe of the aircraft and remote from the engine; and
a tower shaft extending from the engine through the airframe to the accessory gearbox and configured to drivingly connect the engine to the accessory gearbox, wherein the tower shaft comprises:
a first flex joint adjacent the engine, the first flex joint configured to accommodate movement of the engine in relation to the accessory gearbox; and
a second flex joint adjacent the accessory gearbox, the second flex joint configured to accommodate movement of the accessory gearbox in relation to the engine.

2. The apparatus of claim 1, further comprising:
a reduction gearbox arranged between a main shaft of the engine and the tower shaft, the reduction gearbox configured to rotate the tower shaft at a different rotation speed than the main shaft.

3. The apparatus of claim 1, wherein the accessory gearbox includes:
a first shaft configured to drive a first accessory; and
a first set of gears arranged between the tower shaft and the first shaft, the first set of gears configured to rotate the first shaft at a different rotational speed than the tower shaft.

4. The apparatus of claim 3, wherein the accessory gearbox includes:
a second shaft configured to drive a second accessory; and
a second set of gears arranged between the tower shaft and the second shaft, the second set of gears configured to rotate the second shaft at a different rotational speed than the tower shaft.

5. The apparatus of claim 4, wherein a rotational speed of the second shaft is different than a rotational speed of the first shaft.

6. The apparatus of claim 1, further comprising an accessory driven by the accessory gearbox, wherein the accessory is one of a fuel pump, a hydraulic pump, an oil pump, an electric generator, a permanent magnet alternator, or a manual engine starter.

7. The apparatus of claim 1, further comprising:
an engine controller mounted to the accessory gearbox and configured to remotely control the engine;
at least one sensor mounted on the engine; and
a remote interface unit operably coupled to the at least one sensor and configured to transmit outputs of the at least one sensor to the engine controller and control the engine based on signals received from the engine controller.

8. The apparatus of claim 1, further comprising a fuel tank mounted at an elevation equal to or above the accessory gearbox.

9. The apparatus of claim 1, wherein the first flex joint is one of a universal joint or a constant velocity joint.

10. An apparatus comprising:
an engine;
an accessory gearbox mounted remotely from the engine at an elevation equal to or below a fuel tank; and
a tower shaft extending from the engine to the accessory gearbox and configured to drivingly connect the engine to the accessory gearbox,
wherein the tower shaft includes:
a first flex joint adjacent the accessory gearbox, the first flex joint configured to accommodate movement of the accessory gearbox in relation to the engine; and a second flex joint adjacent to the engine, the second flex joint configured to accommodate movement of the engine in relation to the accessory gearbox.

11. The apparatus of claim 10, further comprising:
a reduction gearbox arranged between a main shaft of the engine and the tower shaft, the reduction gearbox configured to rotate the tower shaft at a different rotation speed than the main shaft.

12. The apparatus of claim 10, wherein the accessory gearbox includes:
a first shaft configured to drive a first accessory; and
a first set of gears arranged between the tower shaft and the first shaft, the first set of gears configured to rotate the first shaft at a different rotational speed than the tower shaft.

13. The apparatus of claim 12, wherein the accessory gearbox includes:
a second shaft configured to drive a second accessory; and
a second set of gears arranged between the tower shaft and the second shaft, the second set of gears configured to rotate the second shaft at a different rotational speed than the tower shaft.

14. The apparatus of claim 13, wherein a rotational speed of the second shaft is different than a rotational speed of the first shaft.

15. The apparatus of claim 10, further comprising a fuel pump driven by the accessory gearbox, wherein the fuel pump provides fuel from the fuel tank to the engine.

16. The apparatus of claim 10, further comprising:
an engine controller mounted to the accessory gearbox and configured to remotely control the engine;
at least one sensor mounted on the engine; and
a remote interface unit operably coupled to the at least one sensor and configured to transmit outputs the of at least one sensor to the engine controller and control the engine based on signals received from the engine controller.

17. The apparatus of claim 10, further comprising an aircraft airframe, wherein the engine is positioned on a top side of the airframe.

18. The apparatus of claim 10, wherein the first flex joint is one of a universal joint or a constant velocity joint.

19. An apparatus comprising:
an engine positioned on a top side of an aircraft;
an accessory gearbox mounted within an airframe of the aircraft and remote from the engine;
a fuel tank mounted at an elevation equal to or above the accessory gearbox; and
a tower shaft extending from the engine through the airframe to the accessory gearbox and configured to drivingly connect the engine to the accessory gearbox,
wherein the tower shaft comprises a first flex joint adjacent the engine, the first flex joint configured to accommodate movement of the engine in relation to the accessory gearbox.

20. An apparatus comprising:
an engine;
an aircraft airframe, wherein the engine is positioned on a top side of the airframe;
an accessory gearbox mounted remotely from the engine at an elevation equal to or below a fuel tank; and
a tower shaft extending from the engine to the accessory gearbox and configured to drivingly connect the engine to the accessory gearbox,
wherein the tower shaft includes a first flex joint adjacent the accessory gearbox, the first flex joint configured to accommodate movement of the accessory gearbox in relation to the engine.

* * * * *